United States Patent [19]
Sasaki

[11] Patent Number: 6,100,865
[45] Date of Patent: Aug. 8, 2000

[54] DISPLAY APPARATUS WITH AN INSPECTION CIRCUIT

[75] Inventor: Minoru Sasaki, Tokyo, Japan

[73] Assignee: Kabushiki Kaisha Toshiba, Kawasaki, Japan

[21] Appl. No.: 08/872,178

[22] Filed: Jun. 10, 1997

[30] Foreign Application Priority Data

Jun. 10, 1996 [JP] Japan .................................. 8-147134

[51] Int. Cl.[7] .................................................. G09G 3/36
[52] U.S. Cl. .............................. 345/92; 345/98; 345/100
[58] Field of Search .............................. 345/98, 99, 92, 345/100, 90; 349/54, 55

[56] References Cited

U.S. PATENT DOCUMENTS

| | | | |
|---|---|---|---|
| 5,289,174 | 2/1994 | Suzuki | 345/98 |
| 5,506,516 | 4/1996 | Yamashita et al. | 324/770 |
| 5,576,730 | 11/1996 | Shimada et al. | 345/98 |
| 5,644,331 | 7/1997 | Hazama | 345/99 |
| 5,774,100 | 6/1998 | Aoki et al. | 345/87 |
| 5,784,042 | 7/1998 | Ono et al. | 345/94 |
| 5,786,707 | 7/1998 | Hayama et al. | 324/770 |
| 5,825,439 | 10/1998 | Noriyama | 349/54 |

Primary Examiner—Steven J. Saras
Assistant Examiner—Alecia D. Nelson
Attorney, Agent, or Firm—Pillsbury Madison & Sutro LLP

[57] ABSTRACT

In a display apparatus, a switch circuit including transistors is turned off to isolate a scanning line driving circuit and scanning lines from each other, the output of the scanning line driving circuit is inspected by the output from a terminal of an inspection circuit for the scanning line driving circuit, and the switch circuit is turned on to supply the output of the scanning line driving circuit to the scanning lines to check for a disconnection or a shorting of any of the scanning lines in accordance with the presence or absence or the magnitude of the voltage change appearing across the scanning line inspection circuit.

17 Claims, 15 Drawing Sheets

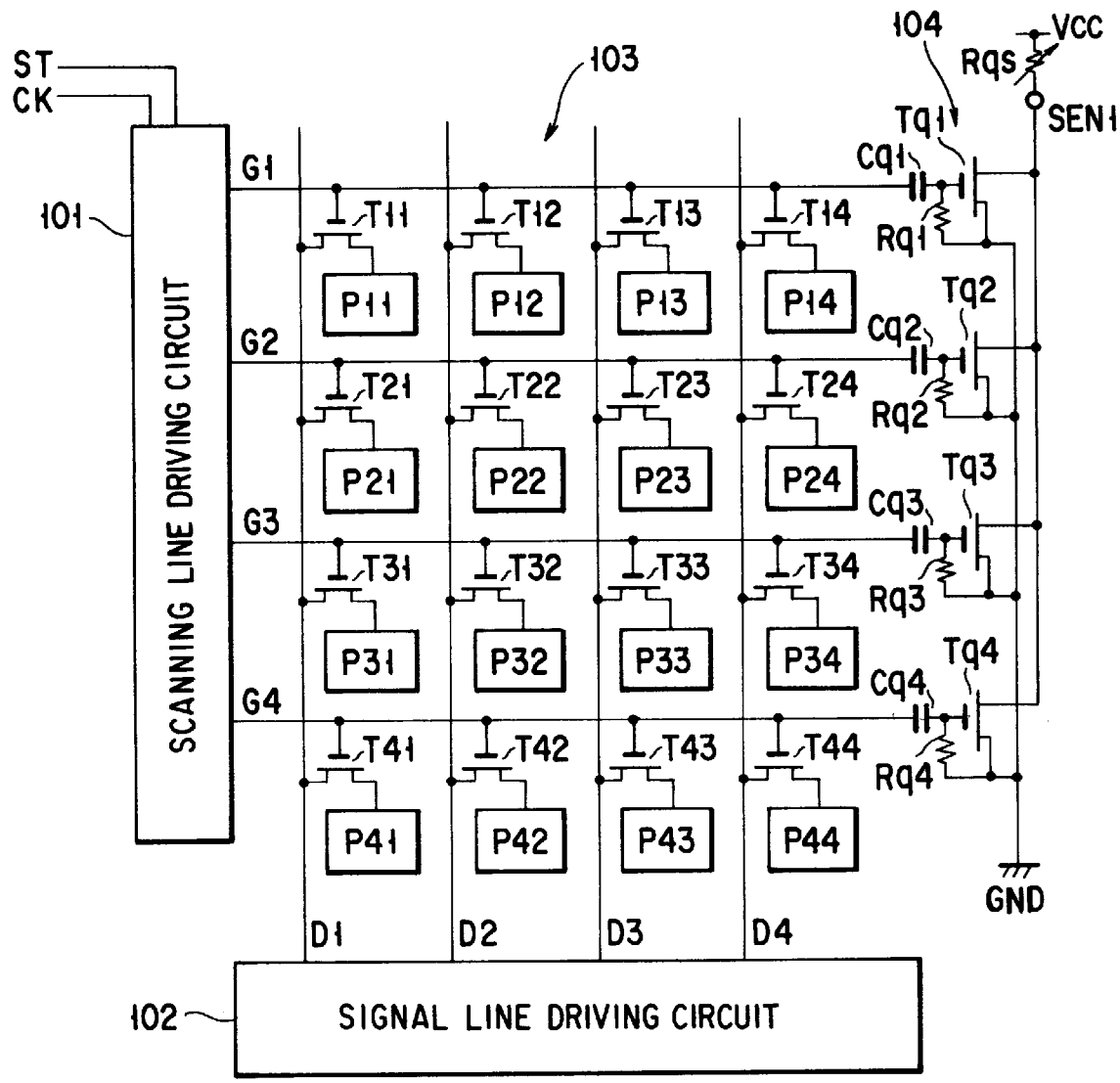
F I G. 1

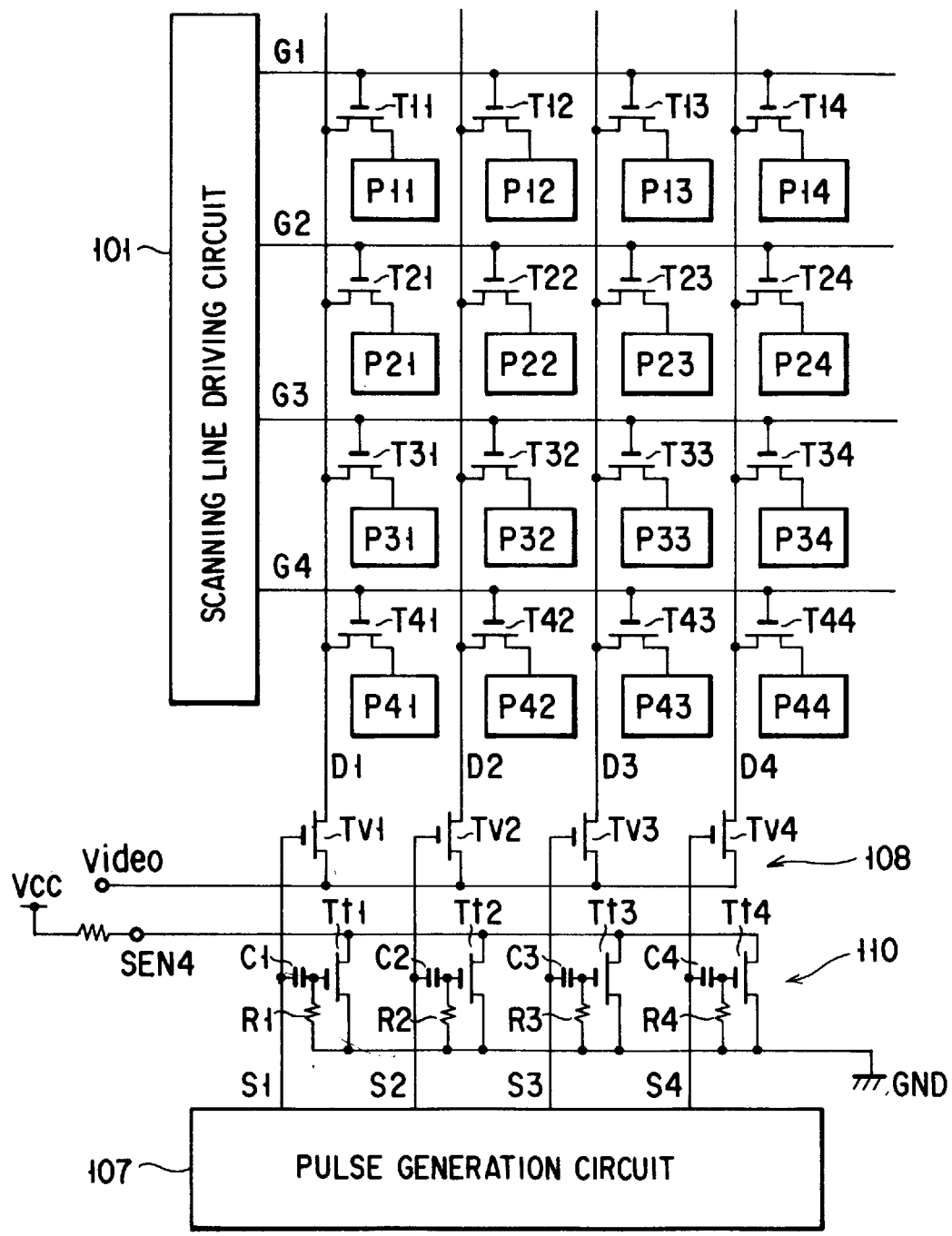
F I G. 4

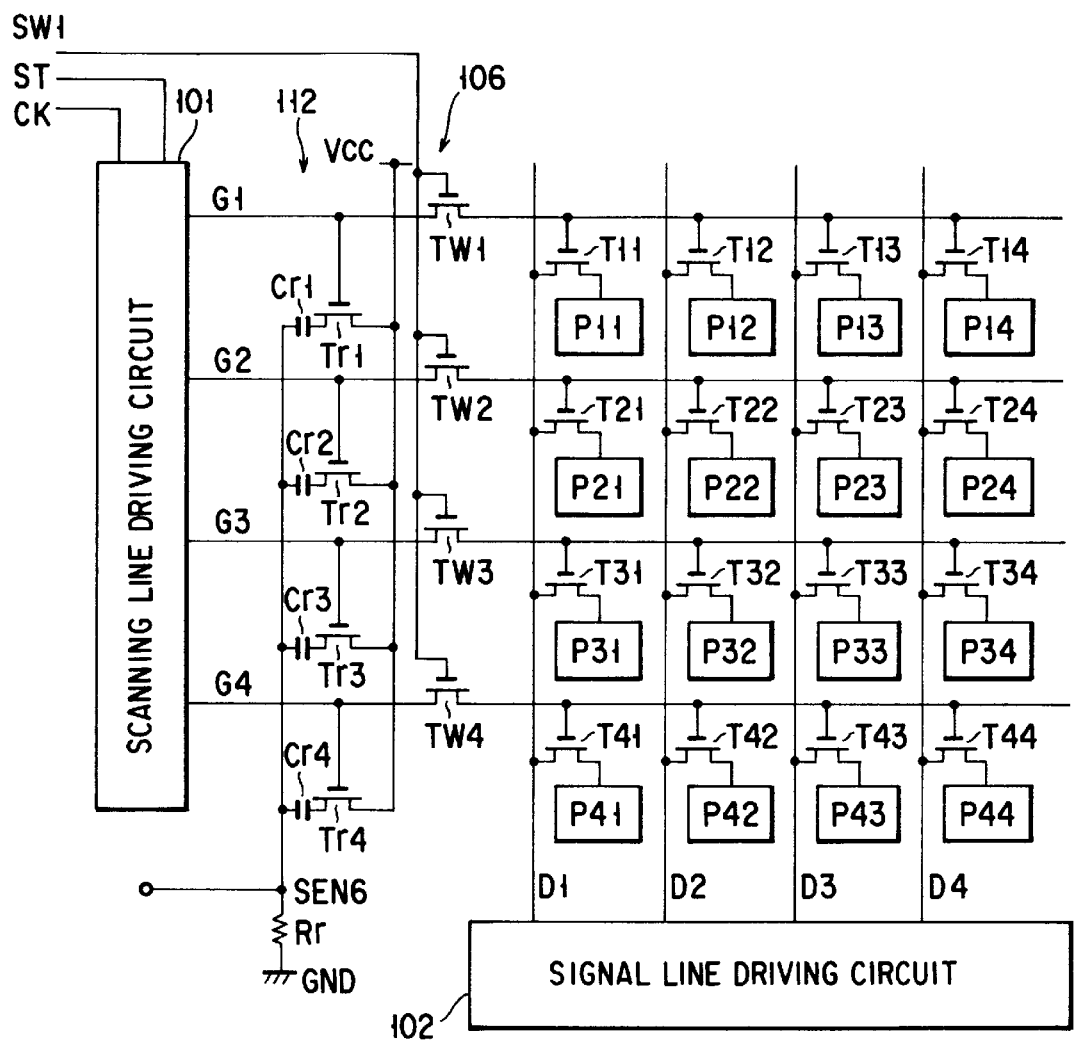
F I G. 6

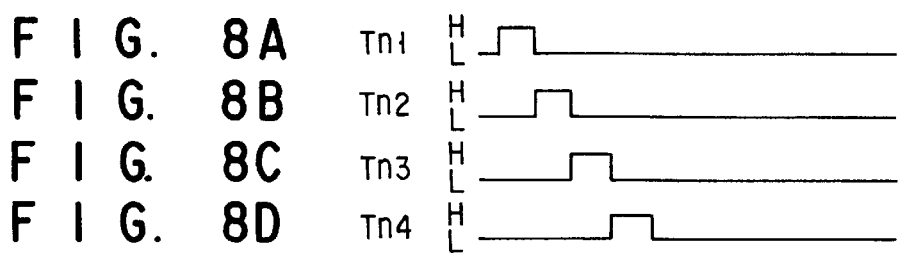
FIG. 8A Tn1
FIG. 8B Tn2
FIG. 8C Tn3
FIG. 8D Tn4
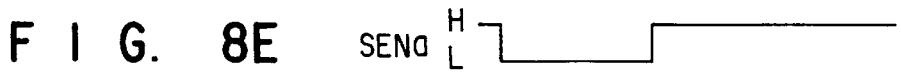
FIG. 8E SENa
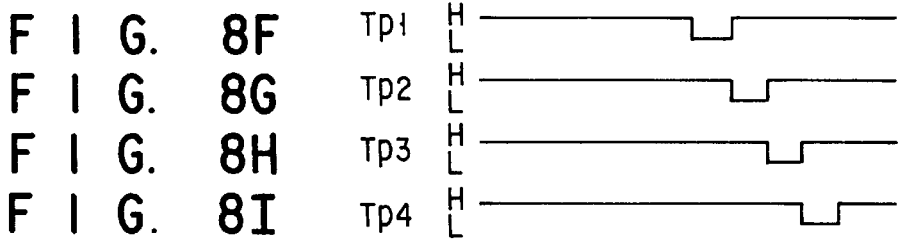
FIG. 8F Tp1
FIG. 8G Tp2
FIG. 8H Tp3
FIG. 8I Tp4
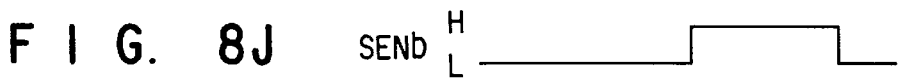
FIG. 8J SENb
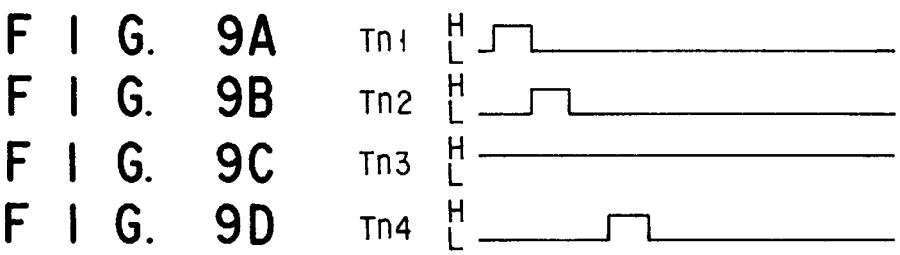
FIG. 9A Tn1
FIG. 9B Tn2
FIG. 9C Tn3
FIG. 9D Tn4
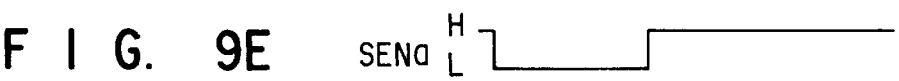
FIG. 9E SENa
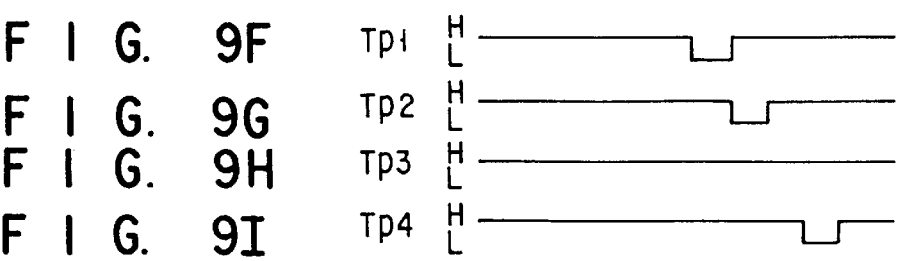
FIG. 9F Tp1
FIG. 9G Tp2
FIG. 9H Tp3
FIG. 9I Tp4
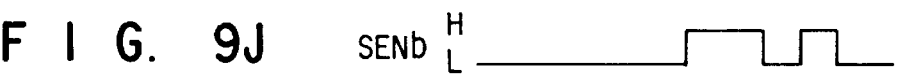
FIG. 9J SENb

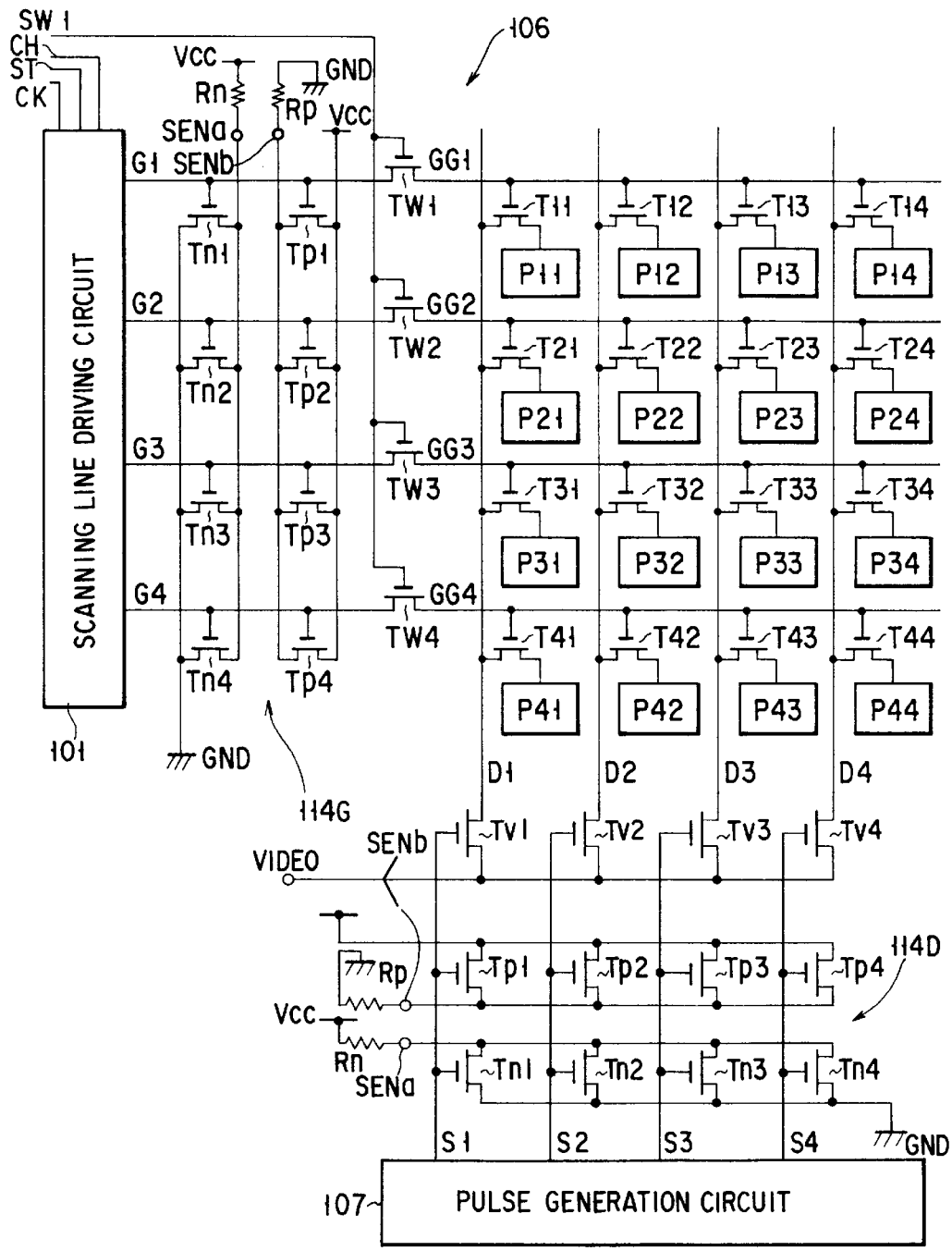
F I G. 10

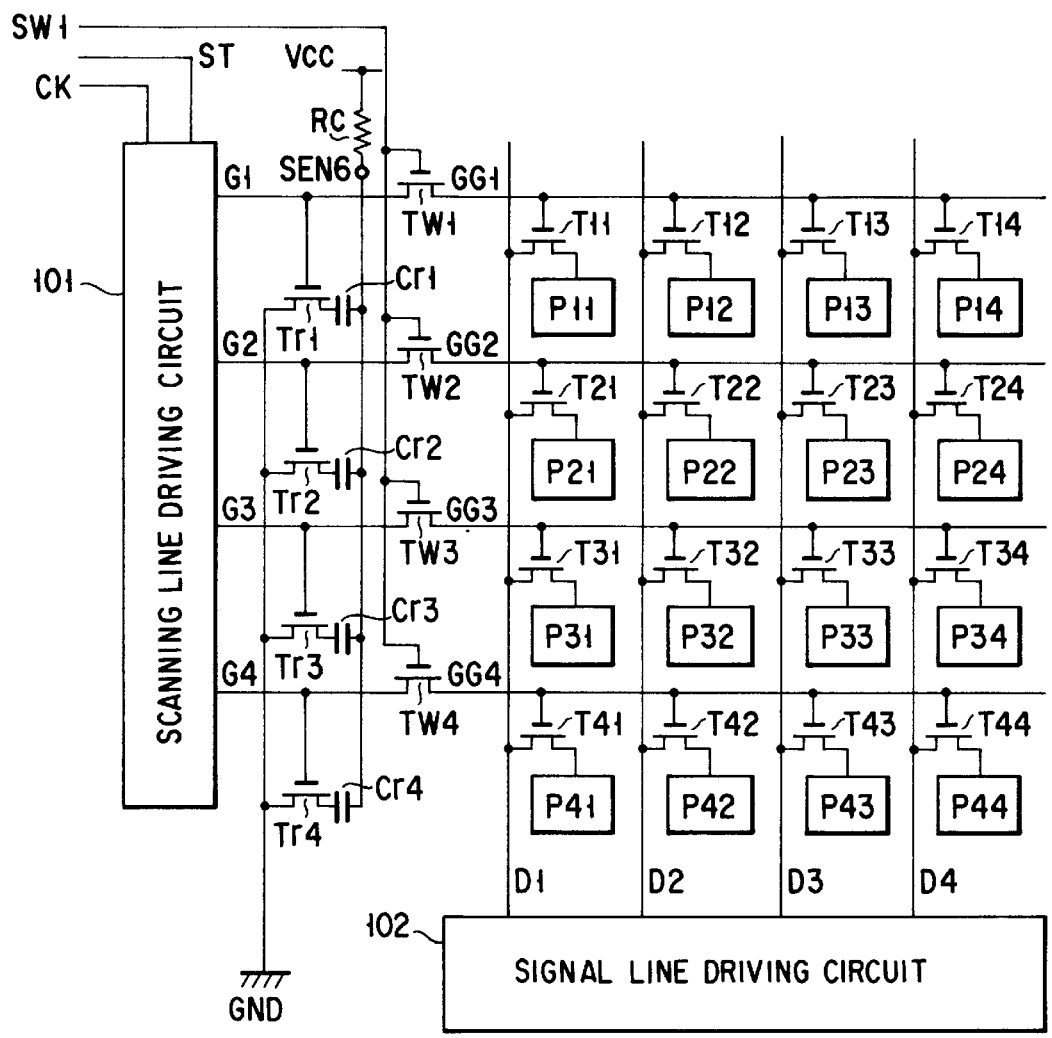
F I G. 14

DISPLAY APPARATUS WITH AN INSPECTION CIRCUIT

BACKGROUND OF THE INVENTION

The present invention relates to a matrix-type display represented by a liquid crystal display apparatus, and more particularly, to a display apparatus having an inspection circuit for inspecting scanning lines and signal lines or the outputs of driving circuits supplied to the wirings of the scanning lines and the signal lines.

A conventional method of inspecting the scanning lines, signal lines or the outputs of driving circuits supplied to these wirings includes in bringing a test probe into direct contact with each of the wirings or the output path of each driving circuit.

With the increase in resolution and capacity of the display apparatus, however, the pitches between the wirings or between the output terminals of each driving circuit are reduced to such an extent that the inspection by the conventional method has now become difficult. Also, simultaneous inspection of a plurality of wirings requires a plurality of probes and complicates the configuration for an increased cost of the inspection apparatus, while a reduced number of probes leads to the disadvantage of a longer inspection time required.

BRIEF SUMMARY OF THE INVENTION

The present invention has been developed in view of the above-mentioned points, and the object of the invention is to provide a display apparatus having a configuration suitable for inspecting the wirings and the outputs of driving circuits of a high-resolution, large-capacity display apparatus.

According to one aspect of the present invention, there is provided a matrix-type display apparatus comprising a plurality of inspection transistors each having a gate connected to a corresponding one of the scanning lines or the signal lines of the matrix-type display apparatus and a source and a drain connected to common wirings respectively supplied with an external voltage, and a plurality of capacitors inserted as required between the scanning lines or the signal lines and at least one of the common wirings.

According to another aspect of the invention, there is provided a matrix-type display apparatus, in which each of the inspection transistors is switched corresponding to switching of the driving signal voltage applied to the scanning line or the signal line connected to the gate of the particular transistor. The voltage applied to or the current flowing in the wiring connected to the gate of each inspection transistor can be detected by detecting whether the voltage between external voltage sources connected to the source and the drain fluctuates by the switching operation of the particular inspection transistor. In the case where the wiring is shorted or defectively open, the voltage or the current value detected changes or fails to change, thereby making it possible to determine the presence or absence of a defect.

According to still another aspect of the invention, there is provided a matrix-type display apparatus, in which a plurality of capacitors are interposed between the wirings to be inspected and wirings supplied with external voltages, respectively. For example, these capacitors are inserted between the wirings and the gates of inspection transistors or between the wirings supplied with external voltages and the sources or the drains of the inspection transistors, respectively. With this configuration, suppose a shorting has occurred in an inspection transistor. In view of the fact that the wiring inspected is insulated from the wirings supplied with external voltages by the capacitor, the normal display operation can be accomplished without any repairing process.

According to a further aspect of the invention, there is provided a matrix-type display apparatus with driving circuits formed in a monolithic structure. The driving circuit for driving the signal lines, for example, includes a series-parallel conversion circuit having a timing control circuit such as a shift register and a sampling circuit. In order to inspect the output of the timing control circuit, a plurality of inspection transistors are inserted with the gates thereof connected to the parallel outputs, respectively, of the timing control circuit and each with the sources and the drains thereof connected to common wirings each supplied with an external voltage, and a capacitor is inserted between each signal line and at least one of the common wirings.

This configuration facilitates the inspection of the output of the driving circuits, and even in the case where a fault occurs in any of the inspection transistors, the normal display operation can be performed without requiring any repair.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a diagram showing an equivalent circuit of a liquid crystal display apparatus according to a first embodiment of the present invention;

FIG. 4 is a diagram showing an equivalent circuit of a liquid crystal display apparatus according to a fourth embodiment of the present invention;

FIG. 6 is a diagram showing an equivalent circuit of a liquid crystal display apparatus according to a sixth embodiment of the present invention;

FIGS. 8A to 8J show timing charts of input and output of an inspection circuit according to the seventh embodiment of the invention;

FIGS. 9A to 9J show timing charts of input and output of an inspection circuit according to the seventh embodiment of the invention;

FIG. 10 is a diagram showing an equivalent circuit of a liquid crystal display apparatus according to an eighth embodiment of the present invention;

FIG. 14 shows a modification of the liquid crystal display apparatus shown in FIG. 13;

Figure 2:
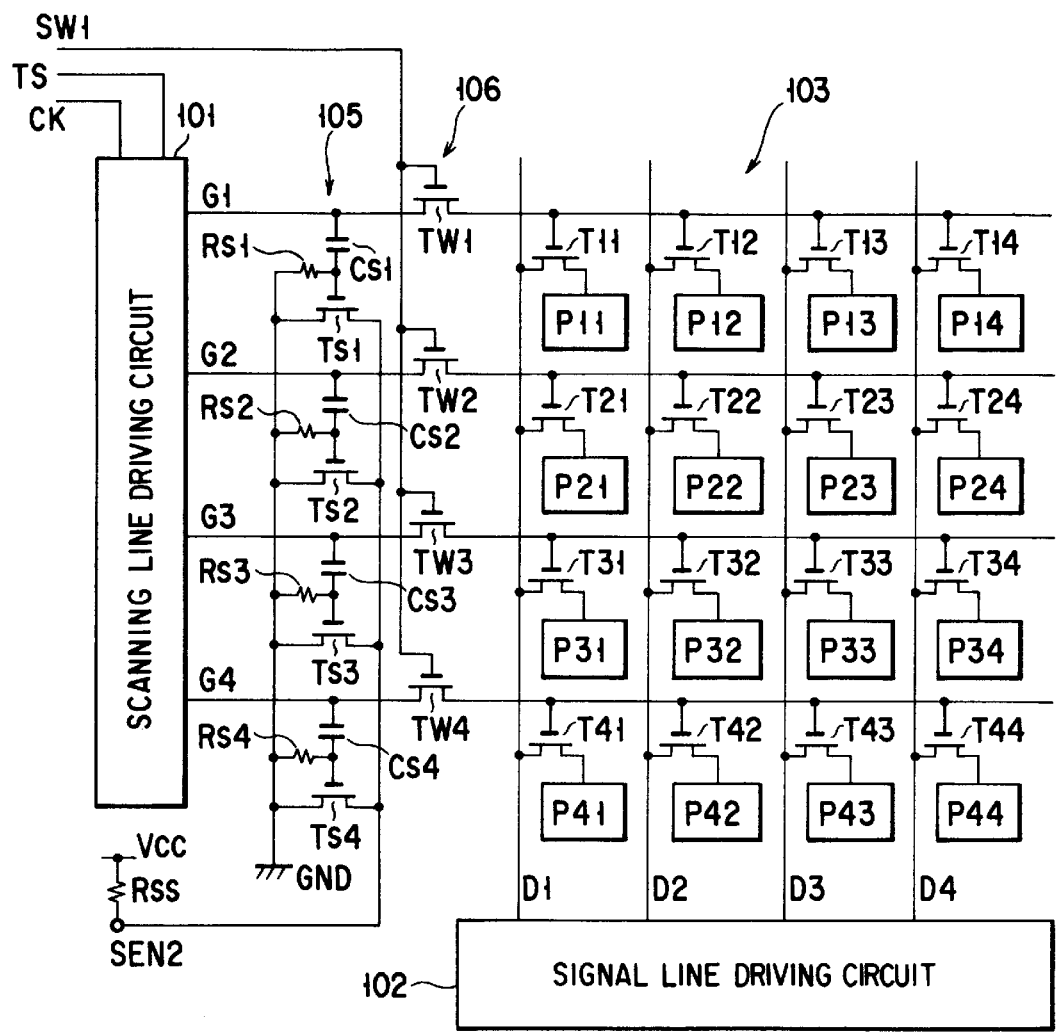
FIG. 2 is a diagram showing an equivalent circuit of a liquid crystal display apparatus according to a second embodiment of the present invention.

DETAILED DESCRIPTION OF THE INVENTION (Embodiment 1)

Now, a liquid crystal display apparatus according to a first embodiment of the invention will be explained with reference to the accompanying drawings. This embodiment represents an example application of the invention to the inspection of disconnection and shorting of the scanning lines.

This liquid crystal display apparatus includes a matrix display section 103 shown in FIG. 1. The matrix display section is configured of a plurality of scanning lines G1 to G4 and a plurality of signal lines D1 to D4 crossing each other, respectively, a plurality of thin-film transistors (TFT) T11 to T44 connected to the respective intersections between the scanning lines and the signal lines, and a plurality of pixel electrodes P11 to P44 connected to the thin-film transistors, respectively.

Each of the pixel electrodes P11 to P44 is capacitively coupled with an opposed electrode not shown through a liquid crystal layer thereby to form a pixel capacitor.

A scanning line driving circuit 101 includes what is called shift registers for generating scanning pulses in synchronism with a clock CK and applies them sequentially to the scanning lines G1 to G4. The other end of each scanning line is connected to the gate of each of n-type TFTs Tq1 to Tq4 through capacitors Cq1 to Cq4, respectively. The sources of the TFTs Tq1 to Tq4 are connected to a common reference voltage wiring GND, or an earth potential, for example.

The drains of the TFTs Tq1 to Tq4, on the other hand, are connected to a power supply Vcc through a terminal SEN1 and a resistor Rq5. The gate of each of the TFTs Tq1 to Tq4 is connected to the source of the particular TFT through the resistors Rq1 to Rq4, respectively.

Now, explanation will be made about a method of checking for a disconnection or a shorting using the above-mentioned configuration.

First, a predetermined signal is applied through a control line ST to the scanning line driving circuit 101 thereby to set the scanning line driving circuit 101 to the inspection mode. In the process, scanning pulses are output sequentially to the scanning lines G1 to G4 from the scanning line driving circuit 101. In the case where the scanning line G1 is not disconnected or shorted or has any other defect when a scanning pulse is applied to G1, this pulse is applied to the gate of the TFT Tq1 through the capacitor Cq1. As a result, the TFT Tq1 is turned on, so that the voltage at the terminal SEN1 drops to a low level by an amount equivalent to the loss due to the resistor Rq5 from the source voltage level Vcc.

If the scanning line is disconnected in the process, on the other hand, the scanning pulse fails to reach the TFT Tq1, and the TFT Tq1 remains off so that the voltage at the terminal SEN1 remains at high level.

In the event that a scanning line is shorted with any of other wirings, in contrast, an incomplete pulse may reach the TFT Tq1. In such a case, the shorting is detected by comparing the SEN1 output upon arrival of the incomplete scanning pulse with the voltage or the current detected by SEN1 upon arrival of a normal scanning pulse. The same object can be achieved by using a variable resistor as shown as the resistor Rq5, the value of which is adjusted appropriately to adjust at the output sensitivity of SEN1. This resistor Rq5 may alternatively be attached as an external unit to the liquid crystal display apparatus. A similar variable resistor can also be used in the embodiments described below.

Then, scanning pulses are applied sequentially also to the scanning lines G2 to G4 thereby to complete the inspection of all the scanning lines.

(Embodiment 2)

FIG. 2 shows a liquid crystal display apparatus according to a second embodiment of the invention. This embodiment is an example in which an inspection circuit having a configuration similar to that of the first embodiment is applied to the output inspection of the scanning line driving circuit. A switch circuit 106 including TFTs TW1 to TW4 is inserted between the outputs of the scanning line driving circuit 101 and the scanning lines G1 to G4 of the matrix display section. The switch circuit 106 has the function of isolating the scanning lines G1 to G4 from the driving circuit 101 at the time of inspecting the output of the scanning line driving circuit 101.

As a result, even in the case where a part of the scanning lines includes a defect, the output of the scanning line driving circuit 101 can be inspected without being adversely affected by the defect. If it is apparent before the inspection of the output of the scanning line driving circuit 101 that the scanning lines have no defect, the switch circuit 106 is not required.

According to this embodiment, the output of the scanning line driving circuit 101 is inspected by applying the output of the scanning line driving circuit 101 sequentially to the gates of the TFTs Ts1 to Ts4 and measuring the output at the SEN2 terminal.

(Embodiment 3)

Figure 3:
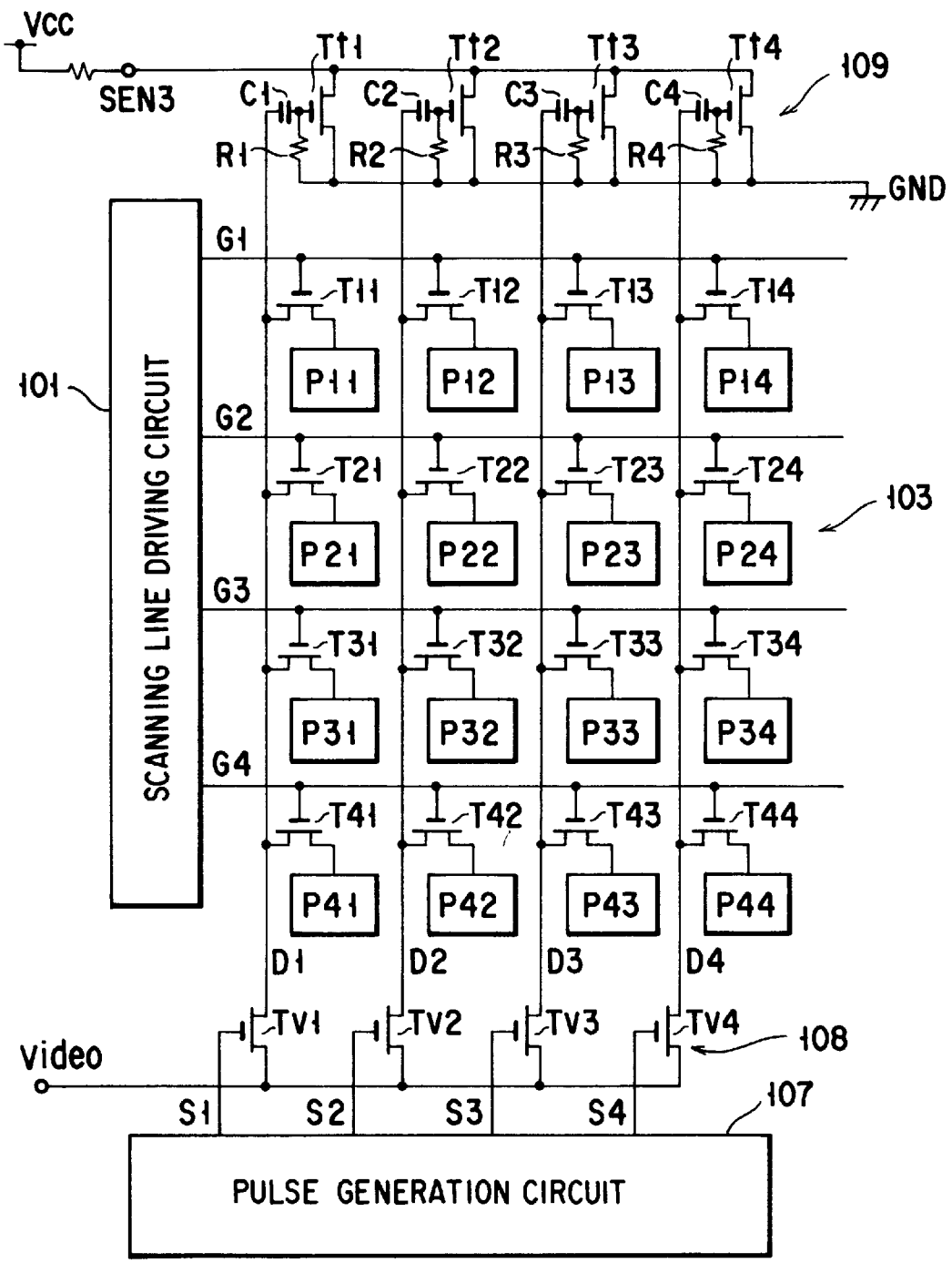
FIG. 3 is a diagram showing an equivalent circuit of a liquid crystal display apparatus according to a third embodiment of the present invention.

FIG. 3 shows a liquid crystal display apparatus according to a third embodiment of the invention. This embodiment represents an example in which a configuration similar to that of the first embodiment is applied to the inspection of a disconnection or shorting of the signal lines. A signal line driving circuit 102 includes a pulse generation circuit 107 having a shift register and a sampling circuit 108.

The pulse generating circuit 107 produces pulses sequentially at outputs S1 to S4. TFTs Tv1 to Tv4 included in the sampling circuit 108 sample a video signal Video input from an external source in accordance with the output of the pulse generation circuit 107 and outputs it to signal lines D1 to D4. The other end of each of the signal lines D1 to D4 is connected to an inspection circuit section 109 having a configuration similar to that of the first embodiment.

According to this embodiment, like in the aforementioned embodiments, a defect attributable to the disconnection or shorting of any of the signal lines can be detected by applying the voltages of the signal lines D1 to D4 to the gates of TFTs Tt1 to Tt4, respectively.

(Embodiment 4)

FIG. 4 shows a liquid crystal display apparatus according to a fourth embodiment of the invention. This embodiment is an example in which an inspection circuit having a configuration similar to that of the first embodiment is applied to the output inspection of the signal line driving circuit. In this embodiment, the inspection circuit 110 is arranged between a pulse generation circuit 107 included in the signal line driving circuit and a sampling circuit 108.

The outputs of the pulse generation circuit 107 are applied to the gates of TFTs Tt1 to Tt4, and the operating conditions of the pulse generation circuit 107 can be inspected by checking the output at SEN4.

According to this embodiment, the signal lines D1 to D4 of the matrix display section can be isolated from the inspection circuit 110 by TFTs Tv1 to Tv4 included in the sampling circuit 108, and therefore, it is not necessary to add a new circuit corresponding to the switch circuit 106 in the second embodiment.

(Embodiment 5)

Figure 5:
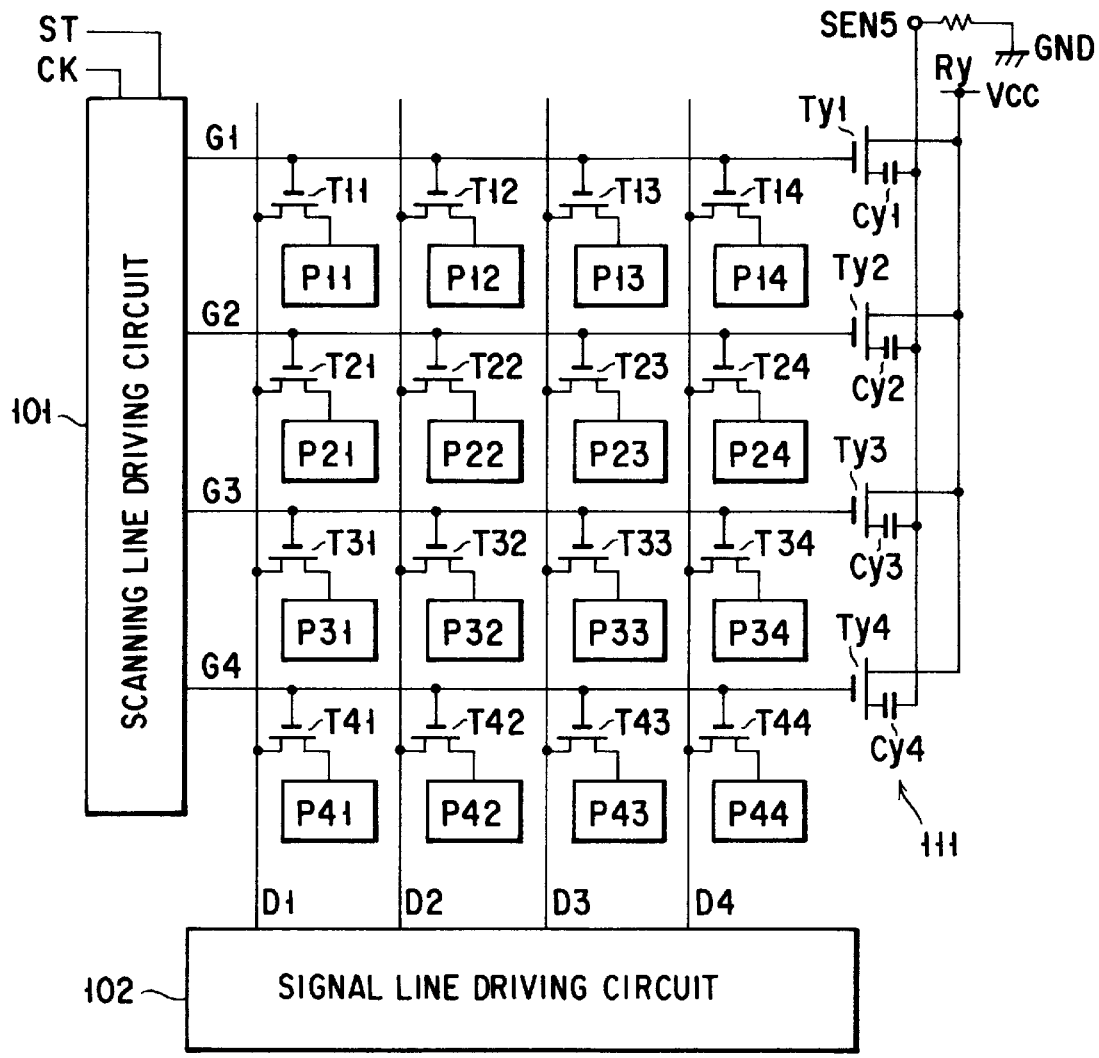
FIG. 5 is a diagram showing an equivalent circuit of a liquid crystal display apparatus according to a fifth embodiment of the present invention.

FIG. 5 shows a liquid crystal display apparatus according to a fifth embodiment of the invention. In this embodiment, the invention is applied to the inspection for a disconnection and a shorting of the scanning lines.

As shown in FIG. 5, the gates of inspection TFTs Ty1 to Ty4 (all n-type TFTs) are connected to an end of each of the scanning lines G1 to G4, respectively, and the sources thereof are connected to capacitors Cy1 to Cy4, respectively. The other end of each of the capacitors Cy1 to Cy4 is connected to a reference voltage GND through a terminal SEN5. Also, the drains of the TFTs Ty1 to Ty4 are connected to a common reference voltage Vcc.

Now, explanation will be made about a method of checking for a disconnection and shorting of the scanning lines using this configuration.

First, a scanning line driving circuit 101 is supplied with a predetermined signal through a control line ST thereby to set the scanning line driving circuit 101 to the inspection mode. At the same time, the scanning line driving circuit 101 produces scanning pulses sequentially to the scanning lines G1 to G4. When a scanning pulse is applied to the scanning line G1, for example, it is applied also to the gate of the TFT Ty1 in the absence of a disconnection or a shorting, so that the TFT Ty1 begins to conduct. As a result, the SEN5 is supplied with the reference voltage Vcc through the capacitor Cy1 and a "high" voltage is detected from the terminal SEN5.

In the case where a scanning pulse fails to reach the gate of the TFT Ty1 due to the disconnection or shorting of the scanning line G1 with any of other wirings, on the other hand, the voltage detected from the terminal SEN5 remains in low state.

Also, in the case where the scanning line G1 is shorted with any of other wirings and an incomplete scanning pulse is applied to the gate of the TFT Ty1, a pulse having an amplitude corresponding to the amplitude of the particular incomplete scanning pulse is output at the terminal SEN5. Consequently, the disconnection or the shorting of the scanning lines can be checked by measuring the output voltage or the output current of the terminal SEN5.

The defect inspection of all the scanning lines is completed by applying the scanning pulses sequentially to the scanning lines G2 to G4 in a similar fashion.

The above-mentioned inspection circuit 111 is applicable also to the disconnection or shorting of the signal lines as in the third embodiment.

(Embodiment 6)

FIG. 6 shows a liquid crystal display apparatus according to a sixth embodiment of the invention. This embodiment represents the case in which an inspection circuit 112 similar to that used in the fifth embodiment is applied to the output inspection of the scanning line driving circuit 101.

Specifically, like in the second embodiment, TFTs Tw1 to Tw4 making up a switch section 106 are interposed between the scanning lines of the matrix display section and n-type TFTs Tr1 to Tr4 constituting an inspection circuit 112. This switch section 106 electrically isolates the scanning lines of the matrix display section from the output of the scanning line driving circuit 101. As a result, the output of the scanning line driving circuit 101 can be accurately inspected without being affected by any defect of the scanning lines.

The output of the signal line driving circuit 102 can also be inspected by providing a similar inspection circuit for the signal line driving circuit 102.

In the configurations shown in FIGS. 5 and 6, the capacitors Cy1 to Cy4 and Cr1 to Cr4 function as a source follower. Therefore, the output of the terminals SEN5, SEN6 changes sensitively in accordance with the change in the gate potential of the TFTs Ty1 to Ty4 and Tr1 to Tr4. As a result, not only a fatal defect of the driving circuit but also a reparable small or other defects such as the likelihood of breaking can be determined by measuring the output of the terminals SEN5, SEN6.

(Embodiment 7)

Figure 7:
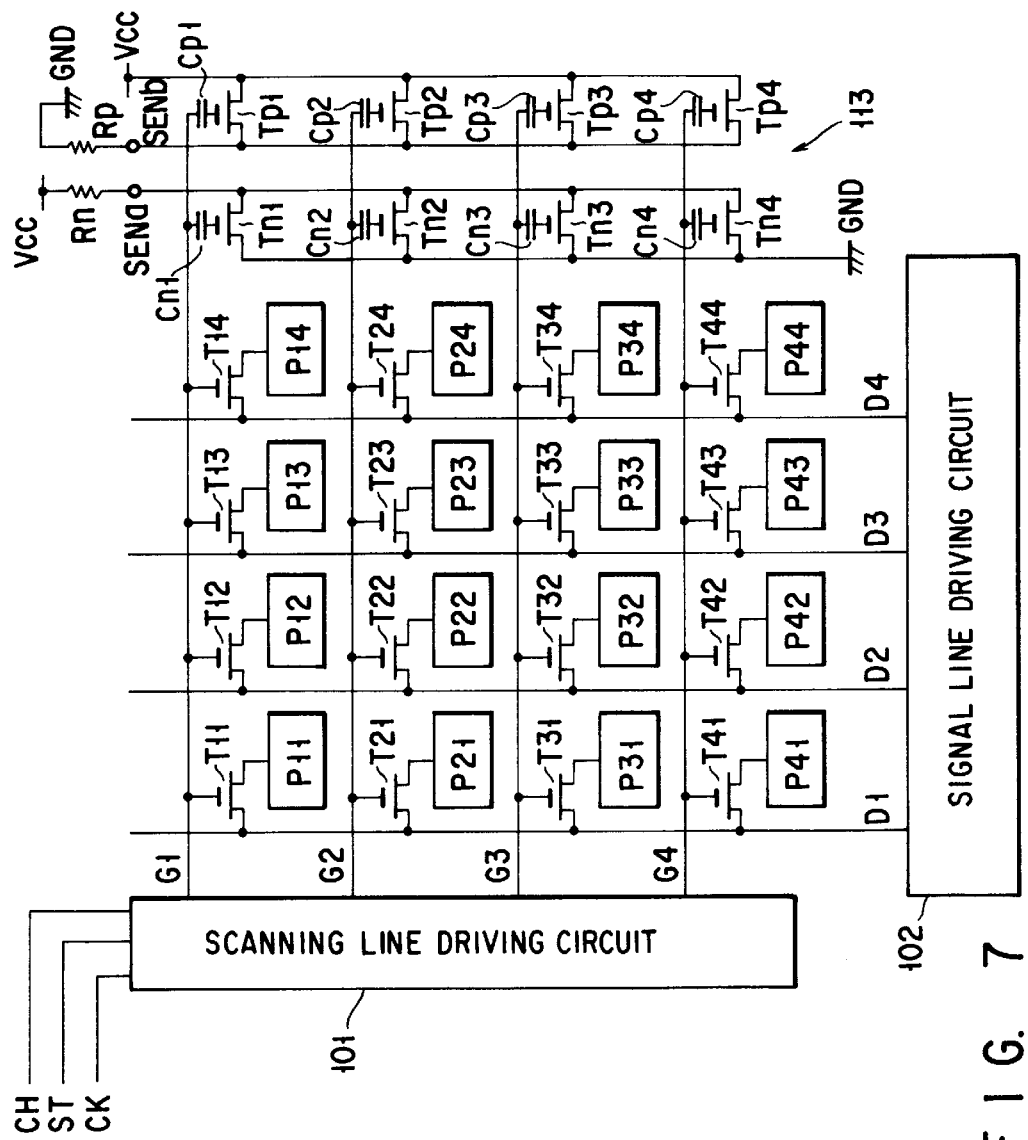
FIG. 7 is a diagram showing an equivalent circuit of a liquid crystal display apparatus according to a seventh embodiment of the present invention.

FIG. 7 shows a liquid crystal display apparatus according to a seventh embodiment of the invention. This embodiment represents the case in which the invention is applied to the inspection of a disconnection or shorting of the scanning lines, or especially, the case in which the scanning lines are inspected by using both n-type TFTs and p-type TFTs at the same time as inspection TFTs.

According to this embodiment, a scanning line driving circuit 101 outputs either a positive pulse or a negative pulse by switching the signal on a control line CH.

The gates of the n-type TFTs Tn1 to Tn4 and the p-type TFTs Tp1 to Tp4 are each connected to an end of each of the scanning lines G1 to G4 through capacitors Cn1 to Cn4, Cp1 to Cp4, respectively, similarly to the first embodiment as shown in FIG. 7. The sources of the n-type TFTs Tn1 to Tn4 are connected to a common reference voltage GND. The drains of the TFTs Tn1 to Tn4, on the other hand, are connected to a reference voltage Vcc through a terminal SENa and a resistor Rn. The sources of the p-type TFTs Tp1 to Tp4 are connected to the reference voltage Vcc, and the drains thereof are connected to the reference voltage GND through a terminal SENb and a resistor Rp.

Now, explanation will be made about a method of inspecting a disconnection and shorting of the scanning lines using the above-mentioned configuration.

The scanning line driving circuit 101 is set to the inspection mode in accordance with an input signal from a control line ST. In this mode, scanning pulses are sequentially applied to the scanning lines G1 to G4 by the scanning line driving circuit 101. The polarity of the scanning pulses can be switched by the input signal from the control line CH as described above.

(1) In the Case Where the Scanning Lines are Normal

FIGS. 8A to 8J are a timing chart of the signals input to and output from the inspection circuit 113 when the display panel is under normal conditions. First, as long as no pulse is applied to the scanning lines G1 to G4, the TFTs Tn1 to Tn4 remain in off state, and the output of the terminal SENa is in high state. Since the TFTs Tp1 to Tp4 are also off under this condition, the output of the terminal SENb is in low state.

Upon application of a positive pulse to the scanning line G1, the TFT Tn1 turns on so that the output of the terminal SENa turns to low state. In view of the fact that the TFT Tp1 still remains off, the terminal SENb remains in low state. Subsequently, sequential application of positive pulses to the scanning lines G2 to G4 turns on the TFTs Tn2 to Tn4 sequentially and turns the output of the terminal SENa to low state.

Assume that a negative pulse is applied to the scanning line G1. The TFT Tp1 turns on and the output of the terminal SENb rises to high state. Since the TFT Tn1 remains off, on the other hand, the output of the terminal SENa remains in high state.

Subsequently, sequential application of negative pulses to the scanning lines G2 to G4 turns on the TFTs Tp2 to Tp4 sequentially, in which case the output of the terminal SENb turns to low state.

(2) In the Case Where the Scanning Lines are Defective

FIGS. 9A to 9J show input and output signals of the inspection circuit 113 with the potential of the scanning line G3 fixed to high state due to a shorting. Under this condition, the TFT Tn3 is kept on, and therefore the terminal SENa maintains the low state. Even when positive scanning pulses are applied to the scanning lines G1 to G4, therefore, the output of the SENa remains in the same state as under the normal condition shown in FIGS. 8A to 8J, so that no defect can be detected.

Then, upon application of negative scanning pulses to the scanning lines G1 to G4, the scanning line G3 is fixed to high state as long as the scanning pulse is applied to the scanning line G3, and therefore the TFT Tp3 remains off. Consequently, the output of the terminal SENb turns to low state, thereby making it possible to detect a defect such as a shorting of the scanning line G3.

Assume that one of the scanning lines is fixed to a low state in potential due to a disconnection or the like defect, on the other hand. Since the terminal SENa turns to a low state upon application of positive pulses to the scanning lines G1 to G4, the presence or absence of a defect can be detected. Also, in the case where an incomplete pulse or a pulse having a small amplitude is applied to any of the TFTs Tn1 to Tn4 or Tp1 to Tp4, the presence or absence of a defect can be detected by measuring the output voltage or the output current of the terminals SENa and SENb.

(3) In the Case where any of TFTs Tn1 to Tn4 or TFTs Tp1 to Tp4 is Defective

First, assume that any one of the TFTs Tn1 to Tn4 is broken and shorted. Since the broken TFT remains always in on state, the output at the terminal SENa is kept in low state. As a result, a defect of a scanning line can be detected by the output of the terminal SENb. In the case where any one of the TFTs Tp1 to Tp4 is shorted, on the other hand, the defect of a scanning line can also be detected similarly by the output of the terminal SENa.

Now, assume that any one of the TFTs Tn1 to Tn4 is defectively open. In the case where the TFT Tn1 is defective, for example, the terminal SENa is fixed to a "high" potential, and therefore a defect is detected similar to the disconnection of the scanning line G1. In the process, if the normality of the scanning line is detected by the terminal SENb, it is decided that the TFT Tn1 is defective.

In similar fashion, in the case where any one of the TFTs Tp1 to Tp4 is defectively open, the defective portion can be determined by checking the output of the terminals SENa and SENb.

If the above-mentioned inspection circuit 113 is provided for the signal lines, it becomes possible to conduct a similar inspection on a disconnection and shorting of the signal lines.

(Embodiment 8)

FIG. 10 shows a liquid crystal display apparatus according to an eighth embodiment of the invention. The embodiment of FIG. 10 represents the case in which an inspection circuit 114G having a similar configuration to the seventh embodiment is applied to the output inspection of the scanning line driving circuit. Specifically, a switch circuit 106 including TFTs Tw1 to Tw4 is interposed between the inspection circuit section 114G and the scanning lines GG1 to GG4 of the matrix display section. The switch circuit 106 has the function of electrically disconnecting the inspection circuit section 114G and the scanning lines from each other at the time of inspecting the output of the scanning line driving circuit 101 in the same manner as the switch circuit of the second embodiment. Also, an inspection circuit 114D having a circuit configuration similar to that of the seventh embodiment is inserted between a pulse generation circuit 107 of the signal driving circuit and sampling circuits Tv1 to Tv4.

According to this embodiment, like in the method of inspecting the scanning lines according to the seventh embodiment, the outputs G1 to G4 of the scanning line driving circuit 101 are switched in polarity and applied sequentially to the gates of inspection transistors TFTs Tn1 to Tn4 and TFTs Tp1 to Tp4 so that the outputs of the terminals SENa and SENb are detected thereby to decide on a defect, if any, of the output of the scanning line driving circuit 101 or the inspection circuit section 114G.

(Embodiment 9)

Figure 11:
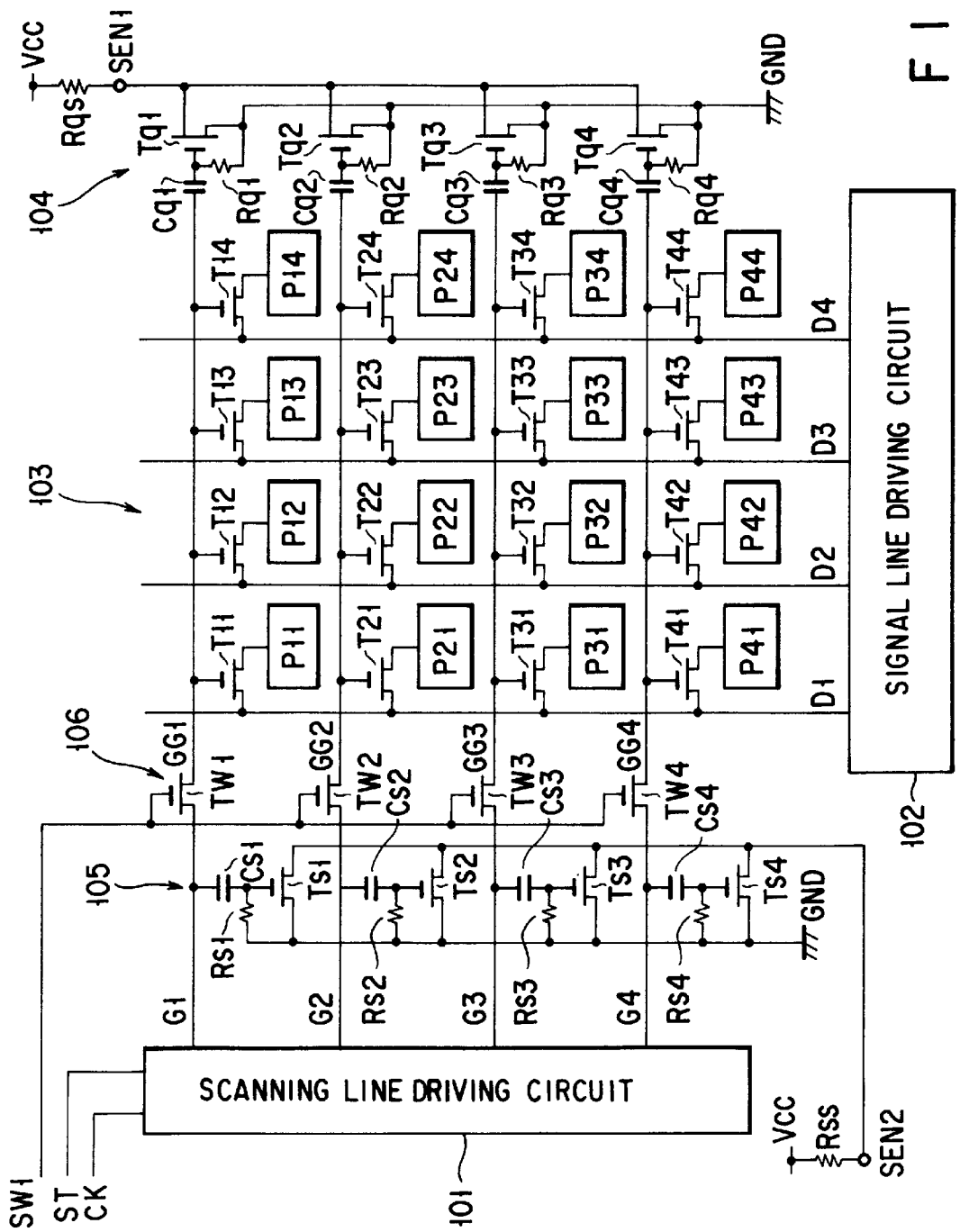
FIG. 11 is a diagram showing an equivalent circuit of a liquid crystal display apparatus according to a ninth embodiment of the present invention.

FIG. 11 shows a liquid crystal display apparatus according to a ninth embodiment of the invention. According to this embodiment, the inspection circuits of the first and second embodiments are combined. As shown in FIG. 11, inspection circuits 105, 104 are arranged both on the output side of the scanning line driving circuit 101 and at the end of the scanning lines far from the output side of the scanning driving circuit 101. At the time of the output inspection of the scanning line driving circuit 101, a signal in high state is applied to a control line SW1 to isolate the scanning line driving circuit 101 from the scanning lines, and the output of the scanning line driving circuit 101 is inspected according to the method of the second embodiment. At the time of inspecting the scanning lines, on the other hand, a signal in low state is applied to the control line SW1, so that the output of the scanning line driving circuit 101 is connected to the scanning lines GG1 to GG4 thereby to inspect the scanning lines according to the method of the first embodiment.

(Embodiment 10)

Figure 12:
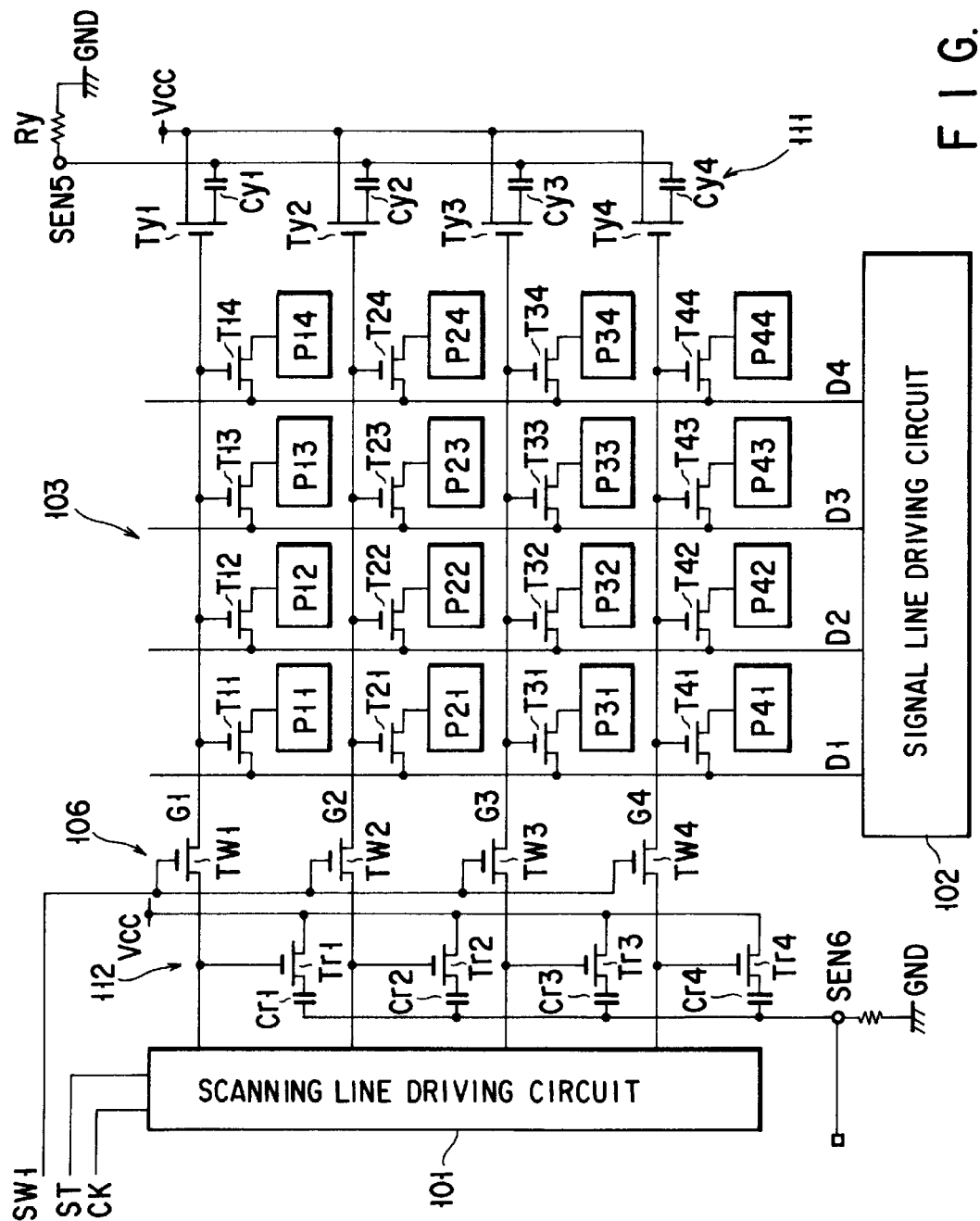
FIG. 12 is a diagram showing an equivalent circuit of a liquid crystal display apparatus according to a tenth embodiment of the present invention.

FIG. 12 shows a liquid crystal display apparatus according to a tenth embodiment of the invention. According to this embodiment, the inspection circuit 111 of the fifth embodiment is combined with that 112 of the sixth embodiment. In this circuit configuration, as in the ninth embodiment, the output of the scanning line driving circuit 101 and the scanning lines can be inspected by operating the switch circuit 106.

(Embodiment 11)

Figure 13:
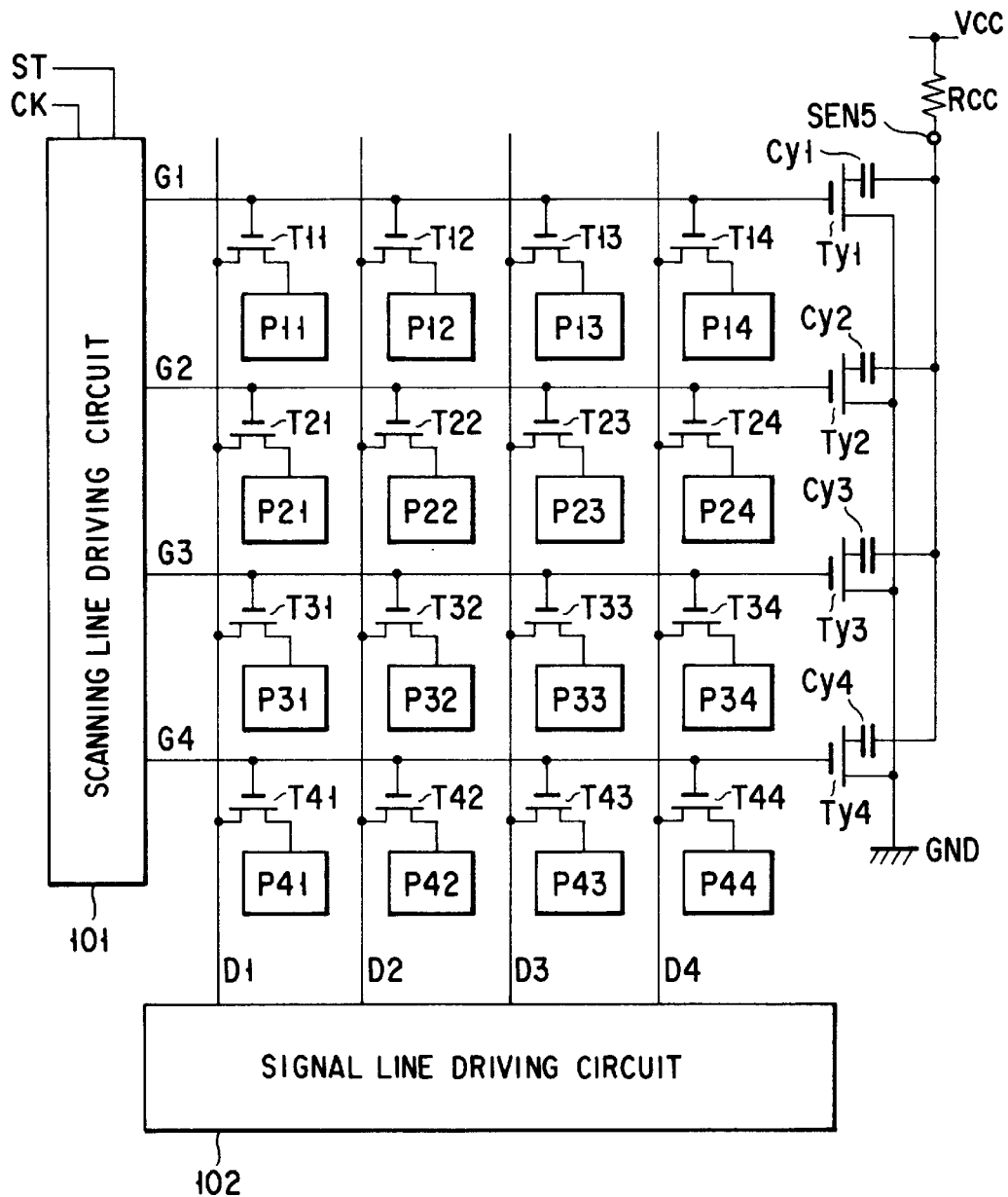
FIG. 13 is a diagram showing an equivalent circuit of a liquid crystal display apparatus according to an 11th embodiment of the present invention.

FIG. 13 shows a liquid crystal display apparatus according to an 11th embodiment of the invention. According to this embodiment, the position of the terminal SEN5 of the inspection circuit 111 of the fifth embodiment is changed. The terminal SEN5 is arranged on a power line whereby a plurality of capacitors Cy1 to Cy4 connected to the inspection TFTs Ty1 to Ty4 are connected to a common potential Vcc. The scanning lines can be checked for a defect in the same manner as in the fifth embodiment using this configuration.

In FIG. 14, the position of the terminal SEN6 of the inspection circuit of the sixth embodiment is changed. This configuration can be used to check for a defect of the output of the scanning line driving circuit in the same manner as in the sixth embodiment.

(Embodiment 12)

Figure 15:
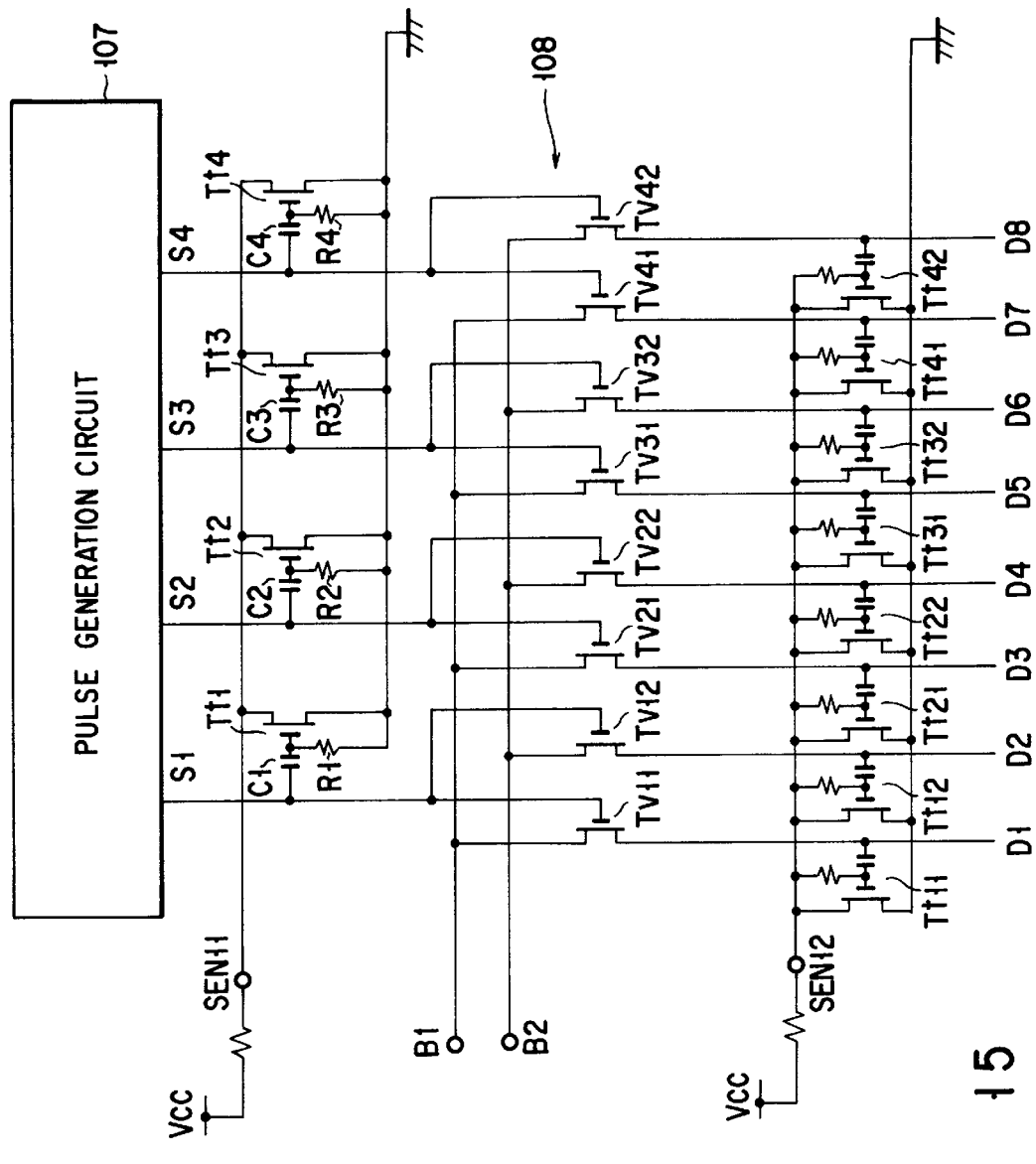
FIG. 15 is a diagram showing an equivalent circuit of a liquid crystal display apparatus according to a 12th embodiment of the present invention.

FIG. 15 shows a 12th embodiment of the invention. This embodiment is a particular case in which the invention is applied to the inspection of the output of the signal line driving circuit. FIG. 15 is a diagram showing a part of the signal line driving circuit including a pulse generation circuit 107.

According to this embodiment, each of outputs S1 to S4 produced from a pulse generation circuit 107 is adapted to drive two signal lines. The output S1, for example, is applied to the gates of sampling switches Tv11 and Tv12 making up a sample hold circuit 108. The drains of the TFTs Tv11 and TFTs Tv12, on the other hand, are connected to different video signal buses B1 and B2, respectively. As a result, the TFT Tv11 and TFT Tv12 sample the video signal at the same sampling time, while independent information are written into signal lines D1 and D2, respectively.

As in the second embodiment, inspection TFTs Tt1 to Tt4 are arranged for the outputs S1 to S4, respectively, of the pulse generation circuit 107, and TFTs Tt11 to Tt42 for inspecting the outputs of the sampling circuit 108. With this configuration, signals output from the sampling switches Tv11 to Tv42 are inspected according to the method of the first embodiment. In the process, if signals of different phases are applied to the two video signal buses B1 and B2, the outputs of the respective sampling switches can be detected in time division.

Figure 16:
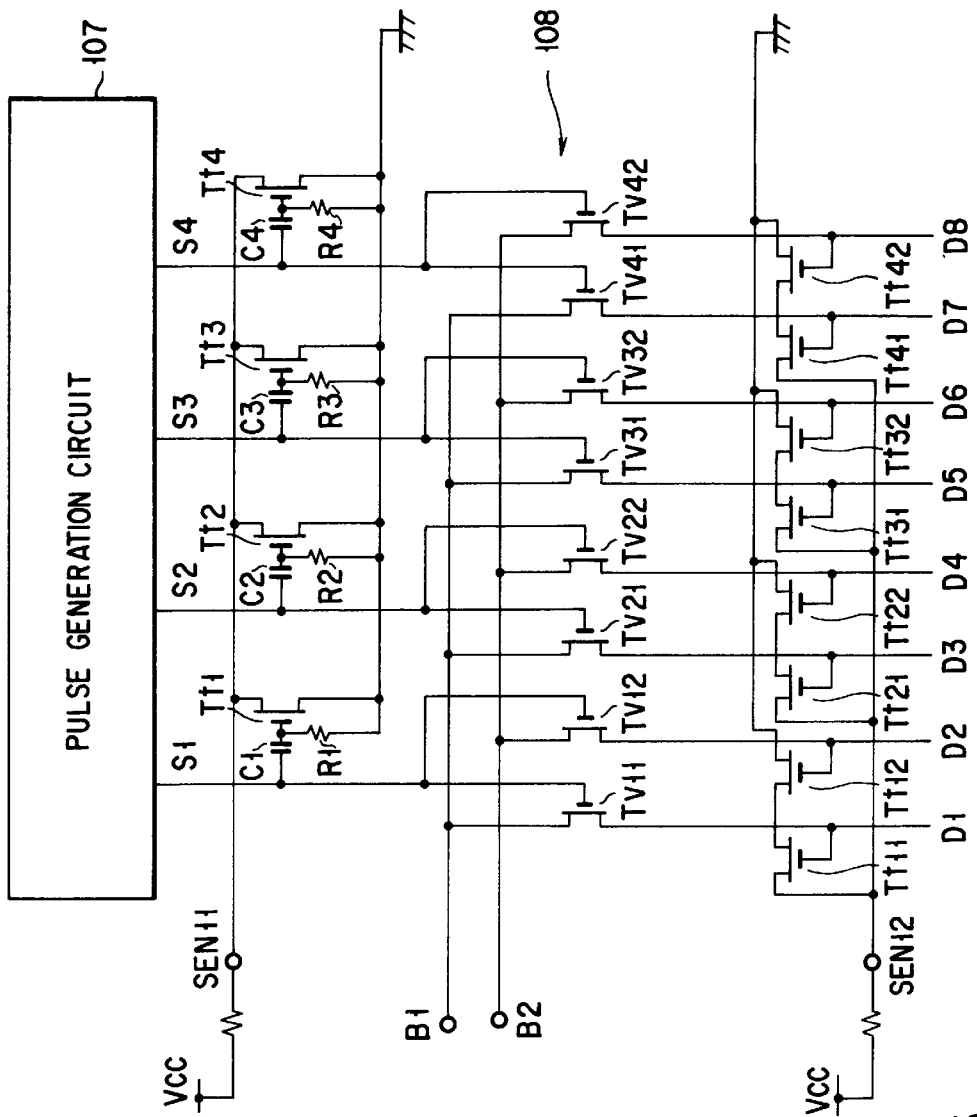
FIG. 16 shows a modification of the liquid crystal display apparatus shown in FIG. 15.

FIG. 16 shows a modified configuration of the inspection circuit for the outputs of the sampling switches. Unlike in the configuration of FIG. 15 comprising the inspection TFTs Tt11 to Tt42 arranged in parallel corresponding to the outputs of the sampling switches, respectively, the configuration of FIG. 16 is such that adjacent inspection TFTs (Tt11 and Tt12, for example) are connected in series with each other. This configuration makes it possible to collectively detect the outputs of the sampling switches Tv11 and Tv12, for example, by an inspection TFT.

The above-mentioned configuration illustrates the case in which each two sampling switches perform the sampling operation at the same timing. The present invention, however, is not limited to such a configuration, but is also applicable to the alternative case in which a multiplicity of sampling switches are driven at the same timing. In such a case, the video signal buses are correspondingly increased in number with the increase in the sampling switches.

In each of the above-mentioned embodiments, a liquid crystal display apparatus having a 4×4 matrix was described as an example. The present invention, however, is not limited to such a liquid crystal display apparatus and can of course be applied to a display apparatus having a N×M matrix with equal effect. Also, the inspection circuits of the respective embodiments can be used in any appropriate combinations. Further, a plurality of inspection circuits having the same function can be used.

Furthermore, such devices as the TFTs and the resistors making up the inspection circuit and the shift registers and the sampling switches constituting the driving circuits can be fabricated in a common process on the same substrate as the pixel TFTs of the matrix display section by use of polysilicon TFTs.

It will thus be understood from the foregoing description that according to the present invention, the inspection of the wirings and the outputs of the driving circuits is simplified, improved in accuracy and facilitated in conformance with the current trend toward a larger capacity and a higher resolution of the liquid crystal display apparatuses.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A display apparatus comprising:

a matrix display section formed on a substrate for displaying an image, said matrix display section including a plurality of scanning lines arranged substantially parallel with one another and forming rows on the substrate, a plurality of signal lines arranged substantially parallel with one another and forming columns on the substrate, the rows and columns forming intersections, a plurality of driving transistors respectively arranged at the intersections, and a plurality of pixel electrodes connected respectively to said signal lines through said driving transistors, the scanning and signal lines being adapted to receive driving signals;

a plurality of inspection transistors with gates thereof connected respectively to a selected one of said plurality of scanning lines and said plurality of signal lines, and drains connected to a common wiring supplied with an external voltage; and a plurality of capacitors each inserted between the selected one of each of said scanning lines and each of said signal lines and said common wiring.

2. A display apparatus comprising:

a matrix display section formed on a substrate for displaying an image, said matrix display section including a plurality of scanning lines arranged substantially parallel with one another and forming rows on the substrate, a plurality of signal lines arranged substantially parallel with one another and forming columns on the substrate, the rows and columns forming intersections, a plurality of driving transistors respectively arranged at the intersections, and a plurality of pixel electrodes connected respectively to said signal lines through said driving transistors, the scanning and signal lines being adapted to receive driving signals;

a plurality of inspection transistors with gates thereof connected respectively to a selected one of said plurality of scanning lines and said plurality of signal lines, and drains connected to a common wiring supplied with an external voltage; and a plurality of capacitors each inserted between the selected one of each of said scanning lines and each of said signal lines and said common wiring;

wherein said capacitors are inserted between the selected one of said plurality of scanning lines and said plurality of signal lines and the gates of said inspection transistors.

3. A display apparatus according to claim 1, wherein each of said capacitors is inserted between said drain and said common wiring.

4. A display apparatus according to claim 1, wherein said inspection transistor and said capacitors are formed on said substrate in a same process as said driving transistors.

5. A display apparatus comprising:

a matrix display section formed on a substrate for displaying an image, said matrix display section including a plurality of scanning lines arranged substantially parallel with one another and forming rows on the substrate, a plurality of signal lines arranged substantially parallel with one another and forming columns on the substrate, the rows and columns forming intersections, a plurality of driving transistors respectively arranged at the intersections, and a plurality of pixel electrodes connected respectively to said signal lines through said driving transistors, the scanning and signal lines being adapted to receive driving signals;

a plurality of inspection transistors with gates thereof connected respectively to a selected one of said plurality of scanning lines and said plurality of signal lines, and drains connected to a common wiring supplied with an external voltage; and a plurality of capacitors each inserted between the selected one of each of said scanning lines and each of said signal lines and said common wiring;

wherein a variable resistor is inserted between a terminal of said common wiring and said external voltage.

6. A display apparatus comprising:

a matrix display section formed on a substrate for displaying an image, said matrix display section including (i) a scanning line driving circuit having a timing control circuit, (ii) a plurality of scanning lines arranged substantially parallel with one another and forming rows on the substrate, the scanning lines adapted to receive scanning signals output from said scanning line driving circuit, and a plurality of signal lines arranged substantially parallel with one another and forming columns on the substrate, the rows and columns forming intersections, (iii) a plurality of driving transistors respectively arranged at the intersections, and (iv) a plurality of pixel electrodes connected respectively to said signal lines through said driving transistors;

a plurality of inspection transistors arranged between said scanning line driving circuit and said matrix display section and having gates thereof connected to said scanning lines respectively, and having drains thereof connected to a common wiring supplied with an external voltage; and a plurality of capacitors inserted between said scanning lines and said common wiring.

7. A display apparatus according to claim 6, wherein a switching element is arranged between a point connecting each of said scanning lines and the gate of a corresponding one of said inspection transistors and said matrix display section.

8. A display apparatus comprising:

a matrix display section formed on a substrate for displaying an image, said matrix display section including a signal line driving circuit having a timing control circuit and a sampling circuit with a plurality of sampling switches for substantially simultaneously sampling a video signal based on output signals from said timing control circuit a plurality of scanning lines, a plurality of signal lines adapted to receive video signals output from said signal line driving circuit, a plurality of driving transistors respectively arranged at intersections of said scanning lines and said signal lines, and a plurality of pixel electrodes connected respectively to said signal lines through said driving transistors;

a plurality of inspection transistors arranged between said timing control circuit and said sampling circuit and having gates thereof connected respectively to said parallel outputs of said timing control circuit, and having drains thereof connected to a common wiring supplied with an external voltage; and a plurality of capacitors inserted between said signal lines and the common wiring, respectively.

9. A display apparatus comprising a matrix display section formed on a substrate for displaying an image, said matrix display section including a signal line driving circuit having a timing control circuit and a sampling circuit with a plurality of sampling switches for substantially simultaneously sampling a video signal based on output signals from said timing control circuit a plurality of scanning lines, a plurality of signal lines being adapted to receive video signals output from said signal line driving circuit, a plurality of driving transistors respectively arranged at intersections of said scanning lines and said signal lines, and a plurality of pixel electrodes connected respectively to said signal lines through said driving transistors;

a plurality of inspection transistors arranged between said timing control circuit and said sampling circuit and having grates thereof connected respectively to said parallel outputs of said timing control circuit, and having drains thereof connected respectively to a common wiring supplied with an external voltage; and a plurality of capacitors inserted between said signal lines and the common wiring, respectively;

wherein each sampling switch is connected to a common output of said timing control circuit, and a plurality of second inspection transistors each have a gate thereof connected to an output of each of said sampling switches, said second inspection transistors being connected in series to each other.

10. A display apparatus comprising:

a matrix display section formed on a substrate for displaying an image, said matrix display section including a signal line driving circuit having a timing control circuit and a sampling circuit with a plurality of sampling switches for substantially simultaneously sampling a video signal based on output signals from said timing control circuit a plurality of scanning lines, a plurality of signal lines being adapted to receive video signals output from said signal line driving circuit, a plurality of driving transistors respectively arranged at intersections of said scanning lines and said signal lines, and a plurality of pixel electrodes connected respectively to said signal lines through said driving transistors;

a plurality of inspection transistors arranged between said timing control circuit and said sampling circuit and having gates thereof connected respectively to said parallel outputs of said timing control circuit, and having drains thereof connected respectively to a common wiring supplied with an external voltage; and a plurality of capacitors inserted between said signal lines and the common wiring, respectively;

wherein a switch block including a plurality of said sampling switches is connected to a common output of said timing control circuit, and a plurality of second inspection transistors each have a gate thereof connected to an output of each of said sampling switches and with a source and drain thereof connected respectively to a plurality of common wirings each supplied with an external voltage.

11. A display apparatus comprising:

a matrix display section formed on a substrate for displaying an image, said matrix display section including a plurality of scanning lines amended substantially parallel with one another and forming rows on the substrate, and a plurality of signal lines arranged substantially parallel with one another and forming columns on the substrate a plurality of driving transistors respectively arranged at the intersections and a plurality of pixel electrodes connected respectively to said signal lines through said driving transistors, the scanning and signal lines being adapted to receive driving signals;

a plurality of inspection transistors of a first conduction type with gates thereof connected respectively to a selected one of said plurality of scanning lines and said plurality of signal lines, and with sources and drains thereof each connected respectively to a common wiring supplied with an external voltage; and a plurality of inspection transistors of a second conduction type with gates thereof connected respectively to the selected one of said plurality of scanning lines and said plurality of signal lines, and with sources and drains thereof each connected respectively to a common wiring supplied with an external voltage.

12. A display apparatus comprising:

a matrix display section formed on a substrate for displaying an image, said matrix display section including a plurality of scanning lines amended substantially parallel with one another and forming rows on the substrate, and a plurality of signal lines arranged substantially parallel with one another and forming columns on the substrate a plurality of driving transistors respectively arranged at the intersections and a plurality of pixel electrodes connected respectively to said signal lines through said driving transistors, the scanning and signal lines being adapted to receive driving signals;

a plurality of inspection transistors of a first conduction type with gates thereof connected respectively to a selected on of said plurality of scanning lines and said plurality of signal lines, and with sources and drains thereof each connected respectively to a common wiring supplied with an external voltage;

a plurality of inspection transistors of a second conduction type with gates thereof connected respectively to the selected one of said plurality of scanning lines and said plurality of signal lines, and with sources and drains thereof each connected respectively to a common wiring supplied with an external voltage; and a plurality of capacitors inserted between the selected one of said plurality of scanning lines and said plurality of signal lines and said common wiring connected to the selected one of the plurality of said inspection transistors of the first conduction type and said plurality of transistors of the second conduction type.

13. A display apparatus according to claim 11, wherein said inspection transistors of the first conduction type and said transistors of the second conduction type are formed on said substrate in a same process as said driving transistors.

14. A display apparatus comprising:

a matrix display section formed on a substrate for displaying an image, said matrix display section including a plurality of scanning lines amended substantially parallel with one another and forming rows on the substrate, and a plurality of signal lines arranged substantially parallel with one another and forming columns on the substrate a plurality of driving transistors respectively arranged at the intersections and a plurality of pixel electrodes connected respectively to said signal lines through said driving transistors, the scanning and signal lines being adapted to receive driving signals;

a plurality of inspection transistors of a first conduction type with gates thereof connected respectively to a selected on of said plurality of scanning lines and said plurality of signal lines, and with sources and drains thereof each connected respectively to a common wiring supplied with an external voltage; and a plurality of inspection transistors of a second conduction type with gates thereof connected respectively to the selected one of said plurality of scanning lines and said plurality of signal lines, and with sources and drains thereof each connected respectively to a common wiring supplied with an external voltage;

wherein a variable resistor is inserted between said common wing connected to the selected one of said inspection transistors of the first conduction type and said inspection transistors of the second conduction type and said external voltage.

15. A display apparatus comprising:

a matrix display section formed on a substrate for displaying an image, said matrix display section including a scanning line driving circuit having a timing control circuit, a plurality of scanning lines arranged substantially parallel with one another and forming rows on the substrate, the scanning lines being adapted to receive scanning signals output from said scanning line driving circuit, a plurality of signal lines arranged substantially parallel with one another and forming columns on the substrate, the rows and columns forming intersections, a plurality of driving transistors respectively arranged at intersections of said scanning lines and said signal lines, and a plurality of pixel electrodes connected to said signal lines respectively through said driving transistors;

a plurality of inspection transistors of a first conduction type arranged between said scanning line driving circuit and said matrix display section, and having gates thereof connected respectively to said scanning lines, and having drains thereof connected to a common wiring supplied with an external voltage; and a plurality of inspection transistors of a second conduction type arranged between said scanning line driving circuit and said matrix display section, and having gates thereof connected respectively to said scanning lines, and having sources thereof connected to a common wiring supplied with an external voltage.

16. A display apparatus comprising:

a matrix display section formed on a substrate for displaying an image, said matrix display section including a scanning line driving circuit having a timing control circuit, a plurality of scanning lines arranged substantially parallel with one another and forming rows on the substrate, the scanning lines being adapted to receive scanning signals output from said scanning line driving circuit, a plurality of signal lines arranged substantially parallel with one another and forming columns on the substrate, the rows and columns forming intersections, a plurality of driving transistors respectively arranged at intersections of said scanning lines and said signal lines, and a plurality of pixel electrodes connected to said signal lines respectively through said driving transistors;

a plurality of inspection transistors of a first conduction type arranged between said scanning line driving circuit and said matrix display section, and having gates thereof connected respectively to said scanning lines, and having drains thereof connected to a common wiring supplied with an external voltage;

a plurality of inspection transistors of a second conduction type arranged between said scanning line driving circuit and said matrix display section, and having gates thereof connected respectively to said scanning lines, and having sources thereof connected to a common wiring supplied with an external voltage; and a plurality of switching elements each interposed between said matrix display section on the one hand and a plurality of points connecting said scanning lines and the gates of said inspection transistors of the first conduction type and the gates of said inspection transistors of the second conduction type respectively.

17. A display apparatus comprising:

a matrix display section formed on a substrate for displaying an image and a scanning line driving circuit including a timing control circuit and a plurality of sampling circuits with a plurality of sampling switches respectively for sampling a video signal based on output signals produced in parallel from said timing control circuit, a plurality of signal lines each being adapted to receive video signals output from said signal line driving circuit, a plurality of scanning lines, a plurality of driving transistors respectively arranged at intersections of said scanning lines and said signal lines, and a plurality of pixel electrodes connected respectively to said signal lines through said driving transistors;

a plurality of inspection transistors of a first conduction type arranged between said timing control circuit and said sampling circuit and having gates thereof connected respectively to said parallel outputs of said timing control circuit, and having drains thereof connected to a common wiring supplied with an external voltage; and a plurality of inspection transistors of a second conduction type arranged between said timing control circuit and said sampling circuit and having gates thereof connected respectively to said parallel outputs of said timing control circuit, and having sources thereof connected to a common wiring supplied with an external voltage.

* * * * *